(12) United States Patent
Valeri et al.

(10) Patent No.: US 9,758,096 B1
(45) Date of Patent: Sep. 12, 2017

(54) SYSTEMS AND METHODS FOR VARIABLE ENGINE AND ELECTRIC MOTOR SOUND CONTROL

(71) Applicant: GM Global Technology Operations LLC, Detroit, MI (US)

(72) Inventors: Frank C. Valeri, Novi, MI (US); Scott M. Reilly, Southfield, MI (US); Richard A. Close, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/245,331

(22) Filed: Aug. 24, 2016

(51) Int. Cl.
*H04R 3/04* (2006.01)
*B60Q 9/00* (2006.01)

(52) U.S. Cl.
CPC .................. *B60Q 9/00* (2013.01); *H04R 3/04* (2013.01); *B60Y 2306/09* (2013.01); *H04R 2499/13* (2013.01)

(58) Field of Classification Search
CPC . B60Q 5/00; B60Q 9/00; G10K 15/04; G10K 2210/51; H04R 3/00; H04R 3/04; H04R 2499/13
See application file for complete search history.

(56) References Cited

U.S. PATENT DOCUMENTS

| | | | | |
|---|---|---|---|---|
| 8,155,343 B2* | 4/2012 | Honji | ..................... | G10K 15/04 381/61 |
| 8,320,581 B2* | 11/2012 | Hera | ..................... | G10K 15/02 381/119 |
| 8,938,079 B2 | 1/2015 | Valeri et al. | | |
| 9,031,248 B2* | 5/2015 | Hera | ..................... | H03G 3/20 381/61 |
| 9,177,544 B2* | 11/2015 | Hera | ..................... | G10K 15/02 |
| 9,271,073 B2 | 2/2016 | Valeri et al. | | |
| 9,299,337 B2* | 3/2016 | Hera | ..................... | G10K 15/02 |
| 9,311,910 B2* | 4/2016 | Hera | ..................... | G10K 11/18 |
| 9,333,911 B2* | 5/2016 | Hera | ..................... | B60Q 9/00 |
| 9,365,158 B2* | 6/2016 | Barlow, Jr. | ............. | B60Q 9/00 |

(Continued)

OTHER PUBLICATIONS

U.S. Appl. No. 14/851,627, dated Sep. 11, 2015, Barlow, Jr. et al.

(Continued)

*Primary Examiner* — Brenda Bernardi

(57) ABSTRACT

An audio system of a vehicle includes a total frequencies module that selectively varies a total number of output frequencies based on one or more present operating parameters of the vehicle. An allocation module, based on one or more present operating parameters of the vehicle, determines an allocation indicative of: (i) a first portion of the total number of output frequencies allocated to outputting first predetermined sounds for internal combustion engine operation; and (ii) a second portion of the total number of output frequencies allocated to outputting second predetermined sounds for electric motor operation. Based on the total number and the first and second portions, an audio driver module applies power to speakers of a passenger cabin of the vehicle to: (i) output first predetermined sounds at harmonic frequencies of the internal combustion engine; and (ii) output second predetermined sounds at harmonic frequencies of the electric motor.

20 Claims, 6 Drawing Sheets

(56) References Cited

U.S. PATENT DOCUMENTS

2015/0016627 A1 1/2015 Barlow, Jr. et al.
2016/0016511 A1* 1/2016 Mueller .................. G10H 1/12
381/86

OTHER PUBLICATIONS

U.S. Appl. No. 15/161,991, dated May 23, 2016, Valeri.
U.S. Appl. No. 15/245,334, dated Aug. 24, 2016, Reilly et al.
U.S. Appl. No. 15/245,400, dated Aug. 24, 2016, Valeri et al.

* cited by examiner

SYSTEMS AND METHODS FOR VARIABLE ENGINE AND ELECTRIC MOTOR SOUND CONTROL

CROSS-REFERENCE TO RELATED APPLICATIONS

The present disclosure is related to U.S. Pat. No. 8,938,079, issued on Jan. 20, 2015, U.S. Pat. No. 9,271,073, issued on Feb. 23, 2016, U.S. Pat. No. 9,365,158, issued on Jun. 14, 2016, U.S. patent application Ser. No. 14/851,627, filed on Sep. 11, 2015, U.S. patent application Ser. No. 15/161,991, filed on May 23, 2016, U.S. patent application Ser. No. 15/245,334, filed on Aug. 24, 2016, and U.S. patent application Ser. No. 15/245,400, filed on Aug. 24, 2016. The entire disclosures of the applications referenced above are incorporated herein by reference.

FIELD

The present disclosure relates to vehicle audio systems and methods and more particularly to audio control systems and methods in vehicles including both an internal combustion engine and one or more electric motors/motor generator units.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some motor vehicles include conventional powertrains having an internal combustion engine and a drivetrain that normally emit sounds during acceleration events, deceleration events, and gear changes. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle.

Some motor vehicles include hybrid electric powertrains including an internal combustion engine and one or more electric motors and/or motor generator units (MGUs). Sound produced by hybrid electric powertrains may be different than the sound produced by conventional powertrains.

SUMMARY

In a feature, an audio system of a vehicle is disclosed. A total frequencies module selectively varies a total number of output frequencies based on a first one or more present operating parameters of the vehicle. An allocation module, based on a second one or more present operating parameters of the vehicle, determines an allocation indicative of: (i) a first portion of the total number of output frequencies allocated to outputting first predetermined sounds for internal combustion engine operation; and (ii) a second portion of the total number of output frequencies allocated to outputting second predetermined sounds for electric motor operation. A harmonics setting module: (i) determines a first set of harmonic frequencies of the internal combustion engine based on (a) the total number of frequencies and (b) the first portion of the total number of frequencies; and (ii) determines a second set of harmonic frequencies of the electric motor based on (a) the total number of frequencies and (b) the second portion of the total number of frequencies. An audio driver module applies power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

In further features: the first set consists of a first number of harmonic frequencies; the second set consists of a second number of harmonic frequencies; and a sum of the first number and the second number is equal to the total number.

In further features the first predetermined sounds are different than the second predetermined sounds.

In further features, when the electric motor is disabled and the engine is in use, the allocation module sets the first portion of the total number of output frequencies equal to the total number output frequencies and sets the second portion of the total number of output frequencies to zero.

In further features, when the electric motor is in use and the engine is in shut down, the allocation module sets the first portion of the total number of output frequencies to zero and sets the second portion of the total number of output frequencies equal to the total number output frequencies.

In further features the allocation module sets the allocation based on an accelerator pedal position.

In further features the allocation module sets the allocation using a predetermined default allocation when the accelerator pedal position is less than a predetermined accelerator pedal position.

In further features the total frequencies module sets the total number of output frequencies to a predetermined number of output frequencies when a driver selects a sleep mode of operation of the vehicle.

In further features the total frequencies module selectively sets the total number of output frequencies to a predetermined default number of output frequencies for outputting the first and second predetermined sounds.

In further features the total frequencies module selectively decreases the total number of output frequencies relative to the predetermined default number of output frequencies based on a driver selected mode of operation of the vehicle.

In further features, a vehicle audio system is disclosed. At least one memory includes computer executable instructions. At least one processor is configured to read and execute the computer executable instructions. The computer executable instructions cause the at least one processor to: selectively vary a total number of output frequencies based on a first one or more present operating parameters of the vehicle; based on a second one or more present operating parameters of the vehicle, determine an allocation indicative of: (i) a first portion of the total number of output frequencies allocated to outputting first predetermined sounds for internal combustion engine operation; and (ii) a second portion of the total number of output frequencies allocated to outputting second predetermined sounds for electric motor operation; determine a first set of harmonic frequencies of the internal combustion engine based on (a) the total number of frequencies and (b) the first portion of the total number of frequencies; determine a second set of harmonic frequencies of the electric motor based on (a) the total number of frequencies and (b) the second portion of the total number of frequencies; and apply power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

In further features, a non-transitory computer readable medium comprising computer executable instructions is described. The computer executable instructions are configured to cause a processor to perform a method comprising: selectively varying a total number of output frequencies based on a first one or more present operating parameters of a vehicle; based on a second one or more present operating parameters of the vehicle, determining an allocation indicative of: (i) a first portion of the total number of output frequencies allocated to outputting first predetermined sounds for internal combustion engine operation; and (ii) a second portion of the total number of output frequencies allocated to outputting second predetermined sounds for electric motor operation; determining a first set of harmonic frequencies of the internal combustion engine based on (a) the total number of frequencies and (b) the first portion of the total number of frequencies; determining a second set of harmonic frequencies of the electric motor based on (a) the total number of frequencies and (b) the second portion of the total number of frequencies; and applying power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

In further features: the first set consists of a first number of harmonic frequencies; the second set consists of a second number of harmonic frequencies; and a sum of the first number and the second number is equal to the total number.

In further features the first predetermined sounds are different than the second predetermined sounds.

In further features the method further includes, when the electric motor is disabled and the engine is in use: setting the first portion of the total number of output frequencies equal to the total number output frequencies; and setting the second portion of the total number of output frequencies to zero.

In further features, the method further includes, when the electric motor is in use and the engine is in shut down: setting the first portion of the total number of output frequencies to zero; and setting the second portion of the total number of output frequencies equal to the total number output frequencies.

In further features, the method further includes setting the allocation based on an accelerator pedal position.

In further features, the method further includes setting the allocation using a predetermined default allocation when the accelerator pedal position is less than a predetermined accelerator pedal position.

In further features, the method further includes setting the total number of output frequencies to a predetermined number of output frequencies when a driver selects a sleep mode of operation of the vehicle.

In further features, the method further includes selectively setting the total number of output frequencies to a predetermined default number of output frequencies for outputting the first and second predetermined sounds.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines of vehicles combust air and fuel within cylinders. A vehicle also includes one or more motor generator units (MGUs) that can be used to perform different functions at different times. For example, an MGU can be used (i) to output torque to a powertrain of the vehicle and (ii) to impose a load on the powertrain of the vehicle to convert mechanical energy into electrical energy, for example, for regeneration.

An audio control module of the vehicle selectively outputs engine and electric vehicle sounds within a passenger cabin of the vehicle via one or more speakers. The audio control module may output engine and/or electrical vehicle sounds, for example, to enhance, mask, or replace sound produced by the engine and/or the MGU(s).

To limit the computational resources consumed to output engine and/or electric vehicle sounds, the audio control module limits a total number of output frequencies used to output engine and electric vehicle sounds. The audio control module determines (i) how many of the total number of output frequencies to use to output engine sounds and (ii) how many of the total number of output frequencies to use to output electric vehicle sounds. Based on one or more vehicle operating parameters, the audio control module may adjust the total number of output frequencies used and/or (i) and (ii).

Figure 1:
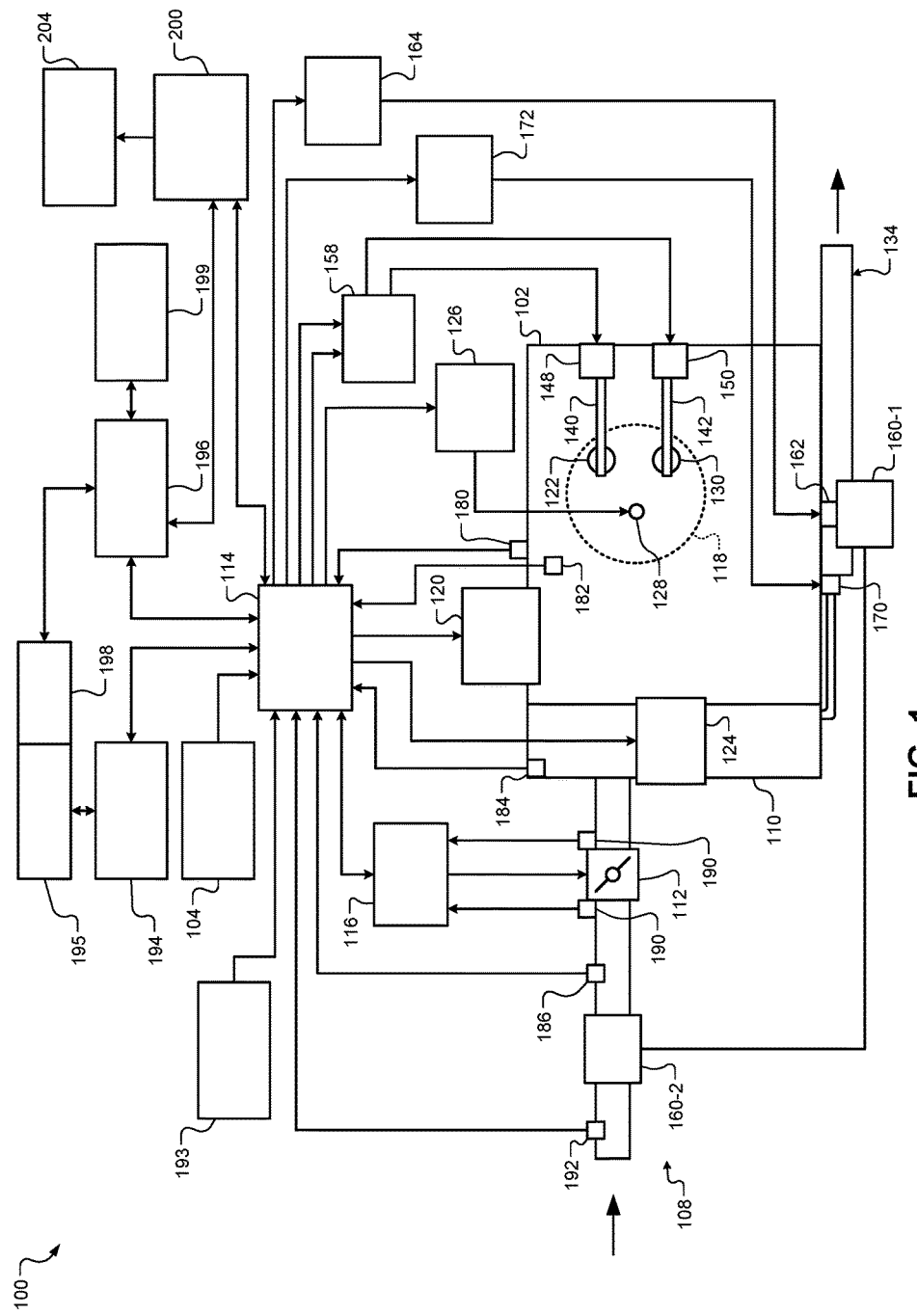
FIG. 1 is a functional block diagram of an example engine system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable in the context of the present application, drawings, and claims. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the MGU 198 to output torque, for example, to supplement engine torque output. For example, the hybrid control module 196 may control the MGU 198 to output (positive) torque when the torque request is greater than a predetermined torque, when the accelerator pedal position is greater than a predetermined position, or when the driver is rapidly depressing the accelerator pedal. The predetermined torque may be calibrated and may be, for example, at least a predetermined fraction of a maximum possible torque output of the engine 102 under the present operating conditions. The predetermined fraction may be calibratable, is greater than zero, and may be, for example, approximately 80 percent, approximately 90 percent, or another suitable value that is greater than 50 percent of the maximum possible torque output of the engine 102.

The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration.

The vehicle also includes an audio control module 200 that controls sound output via speakers 204 within the passenger cabin of the vehicle. The audio control module 200 may control the speakers 204 to output sound based on received amplitude modulation (AM) signals, received frequency modulation (FM) signals, received satellite signals, and other types of audio signals. The audio control module 200 may be implemented, for example, with an infotainment system.

Under some circumstances, the audio control module 200 additionally or alternatively controls the sound output via the speakers 204 based on operation of the engine and/or operation of the MGU 198.

Each rotating machine, such as the engine 102 and the MGU 198, has a fundamental frequency that corresponds to a number of occurrences of an event (e.g., sound production) per period. In the case of the MGU 198, the period may refer to a predetermined number (e.g., one) complete revolution of an output shaft of the MGU 198. The number of sounds produced per period may be related to characteristics of the MGU 198, such as number of windings, configuration of windings, and/or one or more other characteristics of the MGU 198. In the case of the engine 102, the period may refer to one engine cycle, such as two crankshaft revolutions in the case of a four-stroke engine. The number of sounds produced per period may be related to the number of cylinders of the engine 102.

A harmonic (frequency) of a rotating machine may refer to a multiple of the fundamental frequency of the rotating machine. For example, 3 times the fundamental frequency of the rotating machine may be referred to as the third harmonic of the rotating machine. An M-th harmonic of a rotating machine may also be referred to as an M-th order of the rotating machine, where M is an integer greater than 0. Harmonics may also be referred to as orders.

The audio control module 200 outputs one or more predetermined (pre-recorded) engine sounds at one or more harmonics of the engine 102 to, for example, enhance, mask, or replace sound produced via engine operation. The audio control module 200 also outputs one or more predetermined (pre-recorded) electric vehicle sounds at one or more harmonics of the MGU 198, for example, to enhance or mask sound produced via MGU operation. Due to computational limitations of the audio control module 200, however, a total number of output frequencies (and therefore harmonics) that can be used at any time to output predetermined engine sounds and predetermined electric vehicle sounds is limited.

As discussed further below, the audio control module 200 may selectively adjust how many output frequencies are allotted for outputting predetermined engine sounds and how many output frequencies are allotted for outputting predetermined electric vehicle sounds. The audio control module 200 may determine whether to make an adjustment relative to a predetermined default allotment based on one or more operating parameters. Predetermined engine sounds are output at harmonics of the engine 102, while predetermined electric vehicle sounds are output at harmonics of the MGU 198.

The audio control module 200 may receive parameters from the ECM 114, the hybrid control module 196, the transmission control module 194, and/or one or more other control modules of the vehicle. The audio control module 200 may receive parameters from other modules, for example, via a car area network (CAN) bus.

Figure 2:
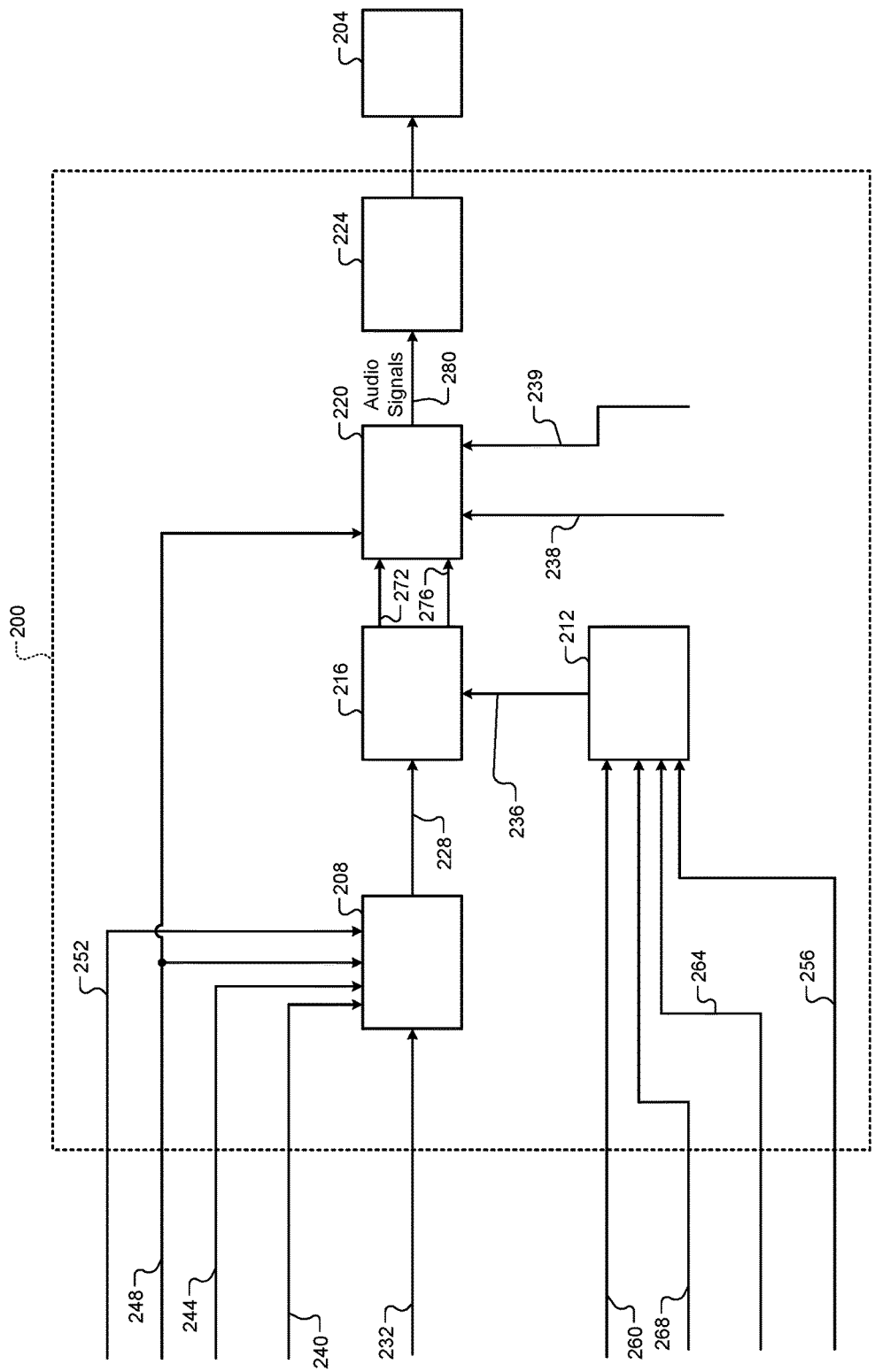
FIG. 2 is a functional block diagram of an example audio system including an audio control module and speakers.

FIG. 2 is a functional block diagram of an example audio system including the audio control module 200 and the speakers 204. The speakers 204 output sound within the passenger cabin of the vehicle. The audio control module 200 includes an allocation module 208, a total frequencies module 212, a harmonics setting module 216, a signal generator module 220, and an audio driver module 224.

The allocation module 208 determines whether to set an engine/electric vehicle allocation 228 to a predetermined default allocation 232 or to differently than the predetermined default allocation 232. The engine/electric vehicle allocation 228 may correspond to (i) a first percentage of a total number of output frequencies 236 to allot to outputting predetermined engine sounds 238 at harmonics of the engine 102 and/or (ii) a second percentage of the total number of output frequencies 236 to allot to outputting predetermined electric vehicle (EV) sounds 239 at harmonics of the MGU 198. The predetermined default allocation 232 may also correspond to (i) a first percentage of a total number of output frequencies 236 to allot to outputting the predetermined engine sounds 238 at harmonics of the engine 102 and/or (ii) a second percentage of the total number of output frequencies 236 to allot to outputting the predetermined EV sounds 239 at harmonics of the MGU 198. The sum of the first and second percentages may be equal to 100%. In the example where an allocation (e.g., 228 or 232) indicates only one of the first percentage and the second percentage, the other one of the first percentage and the second percentage can be set to 100 percent minus the one of the first and second percentages.

As discussed further below, the allocation module 208 determines how to set the engine/electric vehicle allocation 228 based on one or more operating parameters, such as a propulsion mode 240 of the vehicle, a state of charge (SOC) 244 of the battery 199, an accelerator pedal position (APP) 248, and/or a vehicle speed 252. The propulsion mode 240 may indicate, for example, an engine mode, an EV mode, or a hybrid mode, although other modes may be possible. The engine mode may indicate that only the engine 102 (and not the MGU 198) is presently being used for vehicle propulsion. The EV mode may indicate that only the MGU 198 is presently being used for vehicle propulsion. The hybrid mode may indicate that both the engine 102 and the MGU 198 are presently being used for vehicle propulsion. The ECM 114 or the hybrid control module 196 may provide the propulsion mode 240 as an example. The hybrid control module 196 may determine the SOC 244 of the battery 199 and provide the SOC of the battery 199 to the audio control module 200. The APP 248 may be measured using an APP sensor. The vehicle speed 252 may be determined based on one or more wheel speeds of the vehicle measured using wheel speed sensor(s), respectively.

The total frequencies module 212 determines the total (maximum) number of output frequencies 236 available for outputting the predetermined engine and EV sounds 238 and 239. The total frequencies module 212 determines the total number of output frequencies 236 based on one or more present operating parameters. For example, the total frequencies module 212 may set the total number of output frequencies 236 based on a driver selected mode 256 and/or an audio priority signal 260.

The audio priority signal 260 may indicate, for example, whether other audio output is prioritized over the output of predetermined engine and electric vehicle sounds. The driver selected mode 256 may indicate, for example, an economy mode, a track mode, a sleep mode, or another suitable mode has been selected by a driver. Sleep mode may be applicable, for example, to autonomous vehicles. The total frequencies module 212 may set the total number of output frequencies 236, for example, to a predetermined default number of output frequencies 264, a predetermined maximum number of output frequencies 268, or to another total number of output frequencies that is less than the predetermined default number of frequencies.

Based on the engine/electric vehicle allocation 228 and the total number of output frequencies 236, the harmonics setting module 216 sets engine harmonics 272 and electric vehicle harmonics 276. The engine harmonics 272 indicate which harmonics of the engine 102 to output the predetermined engine sounds 238. The electric vehicle harmonics 276 indicate which harmonics of the MGU 198 to output the predetermined EV sounds 239.

The harmonics setting module 216 may determine a first number of harmonics for outputting the predetermined engine sounds 238 based on the total number of output frequencies 236 and the first percentage indicated by the engine/electric vehicle allocation 228. For example, the harmonics setting module 216 may set the first number of harmonics, based on multiplying the first percentage with the total number of output frequencies 236.

The harmonics setting module 216 may determine which specific harmonics (e.g., second harmonic, third harmonic, fourth harmonic, etc.) of the engine 102 to output the predetermined engine sounds 238 based on the first number of harmonics. For example, the harmonics setting module 216 may determine which specific harmonics of the engine 102 to output the predetermined engine sounds using a lookup table that relates first numbers of harmonics to which specific harmonics to output the predetermined engine sounds 238. When the first number of harmonics is zero, the harmonics setting module 216 sets the engine harmonics 272 to indicate that the predetermined engine sounds 238 should not be output on any harmonics of the engine 102.

Regarding outputting the predetermined EV sounds 239, the harmonics setting module 216 may determine a second number of harmonics for outputting the predetermined EV sounds 239 based on the total number of output frequencies 236 and the second percentage indicated by the engine/electric vehicle allocation 228. For example, the harmonics setting module 216 may set the second number of harmonics based on multiplying the second percentage with the total number of output frequencies 236.

The harmonics setting module 216 may determine which specific harmonics (e.g., second harmonic, third harmonic, fourth harmonic, etc.) of the MGU 198 to output the predetermined EV sounds 239 based on the second number of harmonics. For example, the harmonics setting module 216 may determine which specific harmonics of the MGU 198 to output the predetermined EV sounds 239 using a lookup table that relates second numbers of harmonics to which specific harmonics to output the predetermined EV sounds 239. When the second number of harmonics is zero, the harmonics setting module 216 sets the electric vehicle harmonics 276 to indicate that the predetermined EV sounds 239 should not be output on any harmonics of the MGU 198. While the example of allocation between engine and EV is discussed herein, the allocation could also be performed considering one or more other types of powertrains, such as fuel cells, etc. Also, while the example of use of predetermined sounds for masking has provided, masking may be considered separately.

The signal generator module 220 generates audio signals 280 to output the predetermined engine sounds 238 at the harmonic frequencies of the engine 102 specified by the engine harmonics 272. The signal generator module 220 also generates the audio signals 280 to output the predetermined EV sounds 239 at the harmonic frequencies of the MGU specified by the electric vehicle harmonics 276.

The audio driver module 224 applies power (e.g., from the one or more other batteries) to the speakers 204 based on the audio signals 280. In this way, the speakers 204 output the predetermined engine sounds 238 and/or the predetermined EV sounds 239 at the specified harmonics within the passenger cabin of the vehicle.

Figure 3A:
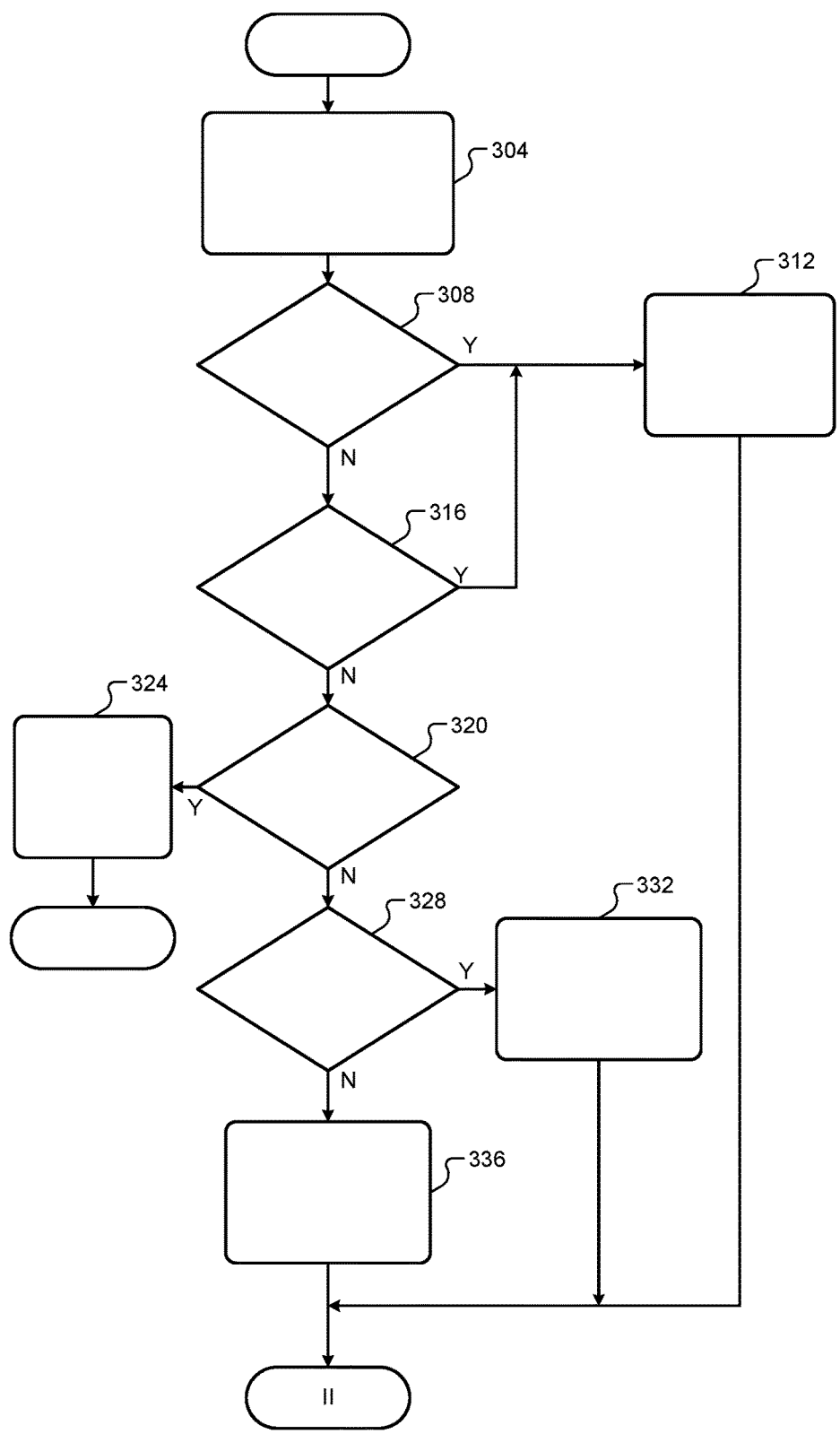
FIGS. 3A and 3B are collectively a flowchart depicting an example method of setting allotting how to output engine sound and electric vehicle sound via one or more speakers.
Figure 3B:
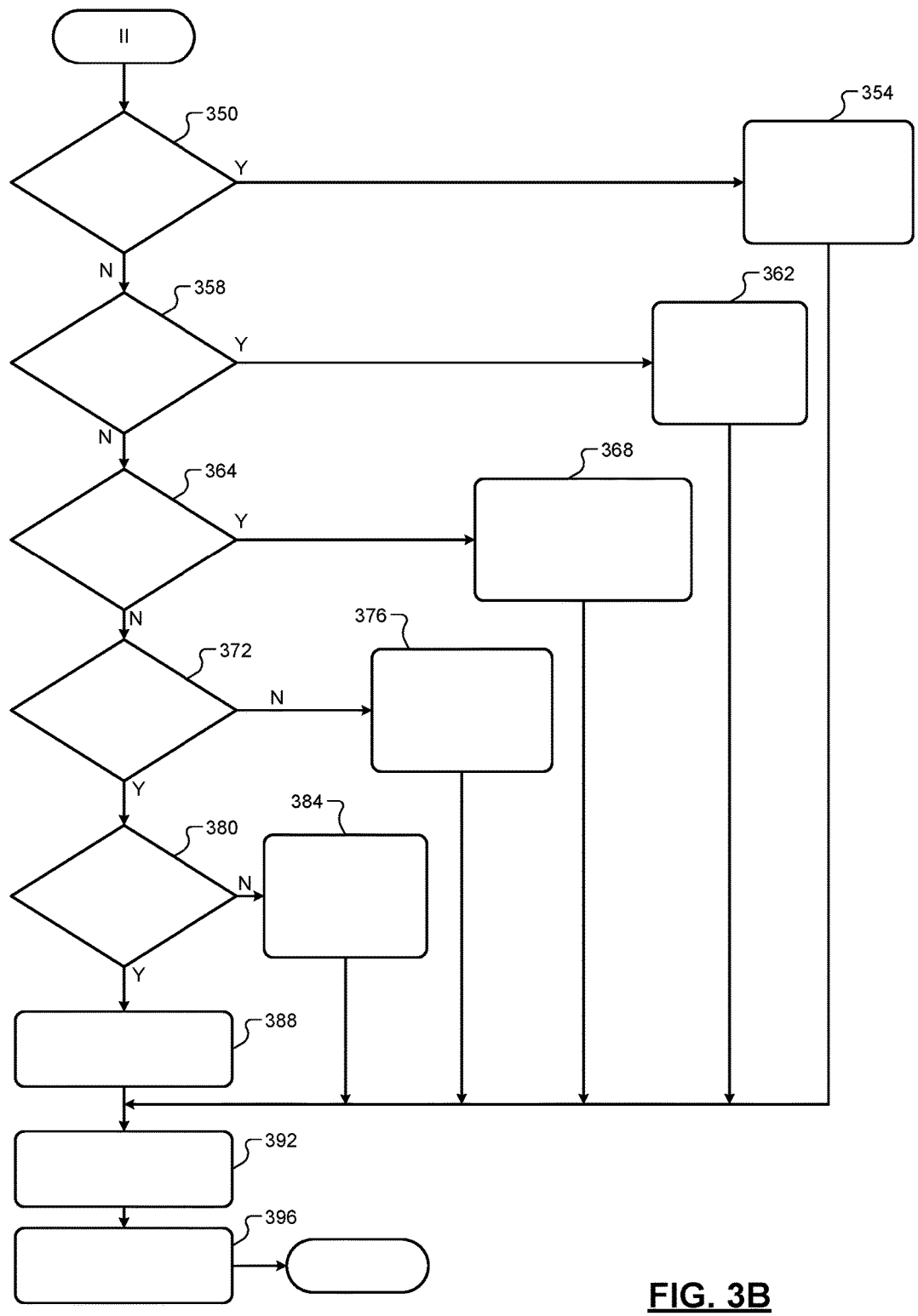

FIGS. 3A and 3B are collectively a flowchart depicting an example method of setting how many output frequencies to output predetermined engine sounds and how many output frequencies to output predetermined electric vehicle sounds. Referring now to FIG. 3A, control begins with 304 where the allocation module 208 obtains the predetermined default allocation 232 and the total frequencies module 212 obtains the predetermined default number of output frequencies 264. For example only, the predetermined default allocation 232 and the predetermined default number of output frequencies 264 may be stored in memory. As examples only, the predetermined default number of output frequencies 264 may be approximately 40 output frequencies, and the predetermined default allocation 232 may be 80% engine sounds and 20% electric vehicle sounds. Other defaults may be used.

At 308, the total frequencies module 212 determines whether the audio priority signal 260 indicates whether other audio is prioritized over outputting the predetermined engine sounds 238 and/or the predetermined EV sounds 239. For example, the total frequencies module 212 may determine whether the audio priority signal 260 is set to a first state at 308. The audio priority signal 260 being set to the first state may indicate that other audio is prioritized over outputting the predetermined engine sounds 238 and/or the predetermined EV sounds 239. The audio priority signal 260 being set to a second state may indicate that other audio is not presently prioritized over outputting the predetermined engine sounds 238 and/or the predetermined EV sounds 239.

If 308 is true, the total frequencies module 212 may set the total number of output frequencies 236 to less than the predetermined default number of output frequencies 264 at 312. For example, the total frequencies module 212 may set the total number of output frequencies 236 to a predetermined number of output frequencies, such as half or another suitable fraction (less than 1/1) of the predetermined default number of output frequencies 264. Control then continues with 350 (FIG. 3B), as discussed further below. If 308 is false, control may continue with 316.

The total frequencies module 212 may determine whether the driver selected mode 256 selected by the driver is set to the economy (ECO) mode at 316. If 316 is true, control transfers to 312, as discussed above. If 316 is false, control may continue with 320. At 320, the total frequencies module 212 may determine whether the driver selected mode 256 is set to the sleep mode. If 320 is true, the total frequencies module 212 may set the total number of output frequencies 236 to zero at 324. Based on the setting of the total number of output frequencies 236 to zero, neither the predetermined engine sounds 238 nor the predetermined EV sounds 239 will be output via the speakers 204. Alternatively, the total frequencies module 212 may set the total number of output frequencies 236 to a predetermined number of output frequencies for masking operation at 320 where the predetermined number may be equal to the predetermined default number of output frequencies or an inter between that value and zero. Sound may then be output for masking engine and/or EV operation. Control may then end. If 320 is false, control may continue with 328.

At 328, the total frequencies module 212 may determine whether the driver selected mode 256 is set to the track mode. If 328 is true, the total frequencies module 212 may set the total number of output frequencies 236 to the predetermined maximum number of output frequencies 268 for outputting the predetermined engine and/or EV sounds 238 and 239. The predetermined maximum number of output frequencies 268 may be greater than, less than, or equal to the predetermined default number of output frequencies 264. If 328 is false, the total frequencies module 212 sets the total number of output frequencies 236 to the predetermined default number of output frequencies 264 at 336. Control continues with 350 after 332 or 336.

Referring now to FIG. 3B, at 350 the allocation module 208 may determine whether the propulsion mode 240 is set to the engine mode. If 350 is true, at 354, the allocation module 208 may set the engine/electric vehicle allocation 228 to 100 percent engine and 0 percent EV, and control may continue with 392, which is discussed further below. In other words, at 354, the allocation module 208 may set the first percentage (for the predetermined engine sounds 238) to 100 percent and set the second predetermined percentage (for the predetermined EV sounds 239) to 0 percent. If 350 is false, control may continue with 358.

At 358, the allocation module 208 may determine whether the propulsion mode 240 is set to the EV mode. If 358 is true, at 362, the allocation module 208 may set the engine/electric vehicle allocation 228 to 100 percent EV and 0 percent engine, and control may continue with 392, which is discussed further below. In other words, at 362, the allocation module 208 may set the first percentage (for the predetermined engine sounds 238) to 0 percent and set the second predetermined percentage (for the predetermined EV sounds 239) to 100 percent. If 358 is false, control may continue with 364.

The allocation module 208 may determine whether the APP 248 is equal to a predetermined maximum APP at 372. The APP 248 may have a range between 0 and 100 percent. An APP of 0 percent may correspond to a steady-state position where the accelerator pedal rests when the driver is not applying pressure to the accelerator pedal. An APP of 100 percent may correspond to a position where the driver has actuated the accelerator pedal to at least a predetermined maximum extent. Using the above example range between 0 and 100 percent, the predetermined maximum APP may be 100 percent.

If 364 is true, the allocation module 208 may set the engine/electric vehicle allocation 228 to the predetermined default allocation 232 at 368, and control may continue with 392, which is discussed further below. The allocation module 208 may also instruct the signal generator module 220 to, in addition to the predetermined engine and EV sounds 238 and 239, generate the audio signals 280 to output predetermined acceleration sounds at 368.

If 364 is false, control may continue with 372. The predetermined default allocation 232 may be calibratable. For example only, the predetermined default allocation 232 may be approximately 80 percent (the first percentage) for the predetermined engine sounds 238 and 20 percent (the second percentage) for the predetermined EV sounds 239 or another suitable allocation between the predetermined engine and EV sounds 238 and 239.

At 372, the allocation module 208 may determine whether the APP 248 is greater than a predetermined APP. The predetermined APP is positive and may be, for example, 50 percent or greater using the example range of APPs between 0 and 100 percent provided above. If 372 is false, the allocation module 208 may set the engine/electric vehicle allocation 228 to the predetermined default allocation 232 at 376, and control may continue with 392, which is discussed further below. If 372 is true, control may continue with 380.

At 380, the allocation module 208 may determine whether operation in the hybrid mode (or use of MGU operation for propulsion) can continue. For example, the allocation module 208 may determine whether the SOC 244 of the battery 199 is greater than a predetermined value. If 380 is false, the allocation module 208 may set the engine/electric vehicle allocation 228 to provide increased engine sound (i.e., increase the first percentage) and decreased EV sound (i.e., decrease the second percentage) relative to the predetermined default allocation 232. For example, relative to the predetermined default allocation 232, the allocation module 208 may set the engine/electric vehicle allocation 228 to a predetermined non-hybrid mode allocation with a higher first percentage (for outputting the predetermined engine sounds 238) and a lower second percentage (for outputting the predetermined EV sounds 239). If 380 is true, relative to the predetermined default allocation 232, the allocation module 208 may set the engine/electric vehicle allocation 228 to provide decreased engine sound (i.e., decrease the first percentage) and increase EV sound (i.e., increase the second percentage). For example, the allocation module 208 may set the engine/electric vehicle allocation 228 to a predetermined hybrid mode allocation with a lesser first percentage (for outputting the predetermined engine sounds 238) and a higher second percentage (for outputting the predetermined EV sounds 239) than the predetermined default allocation 232. Control may continue with 392 after 384 or 388.

At 392, the harmonics setting module 216 determines the first number of harmonics to output the predetermined engine sounds 238 and the second number of harmonics to output the predetermined EV sounds 239 based on the engine/electric vehicle allocation 228 and the total number of output frequencies 236. Also at 392, the harmonics setting module 216 determines the specific harmonics to output the predetermined engine sounds 238 based on the first number and the specific harmonics to output the predetermined EV sounds 239 based on the second number.

At 396, the signal generator module 220 generates the audio signals 280 to output the predetermined engine sounds 238 and the predetermined EV sounds 239 and the specified harmonics, and the audio driver module 224 applies powers to the speakers 204 based on the audio signals 280. The speakers 204 then output sound within the passenger cabin accordingly. While control is shown as ending, FIGS. 3A and 3B may be illustrative of one control loop and control may return to 304.

Figure 4A:
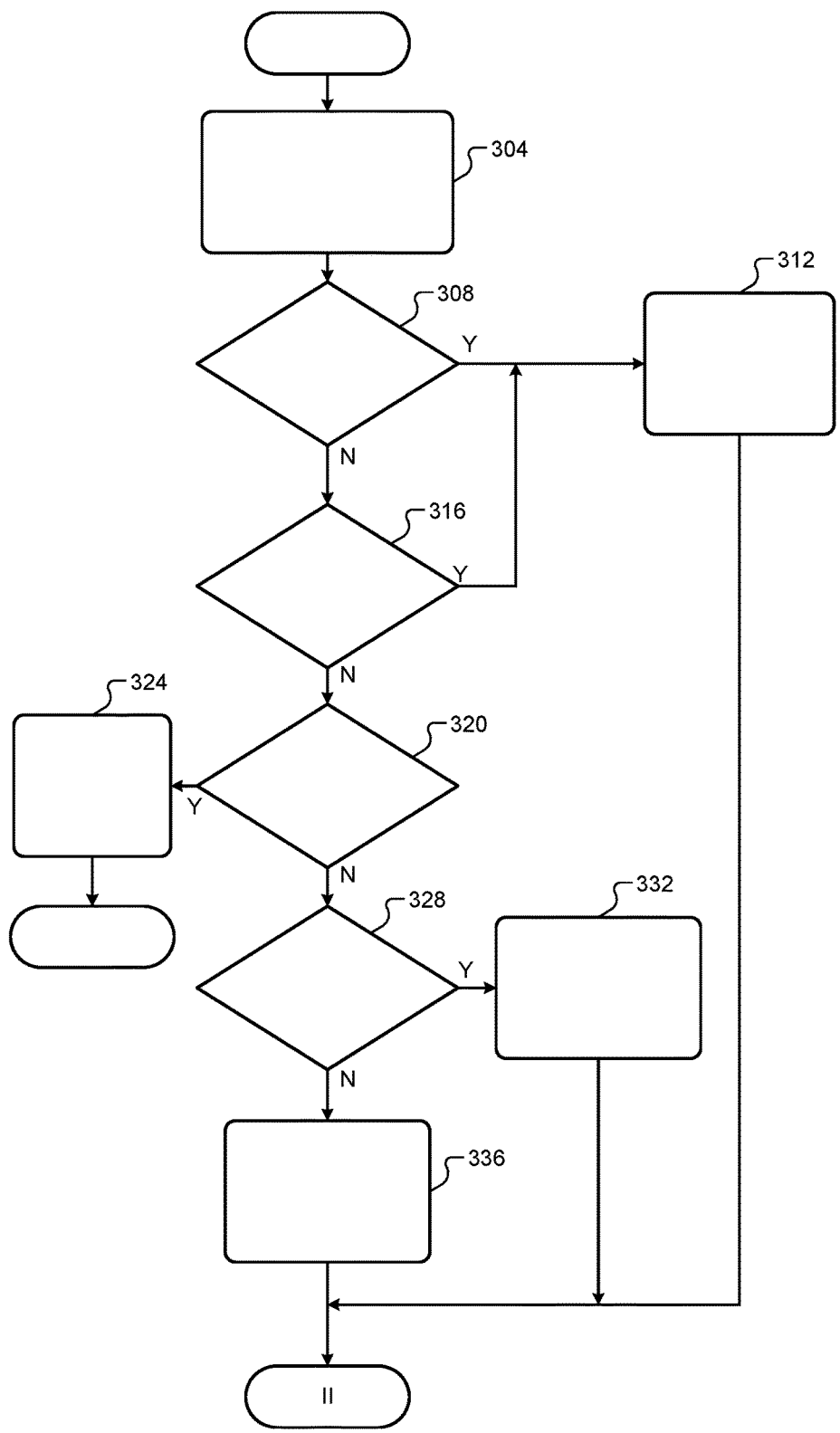
FIGS. 4A and 4B are collectively a flowchart depicting an example method of setting allotting how to output engine sound and electric vehicle sound via one or more speakers.
Figure 4B:
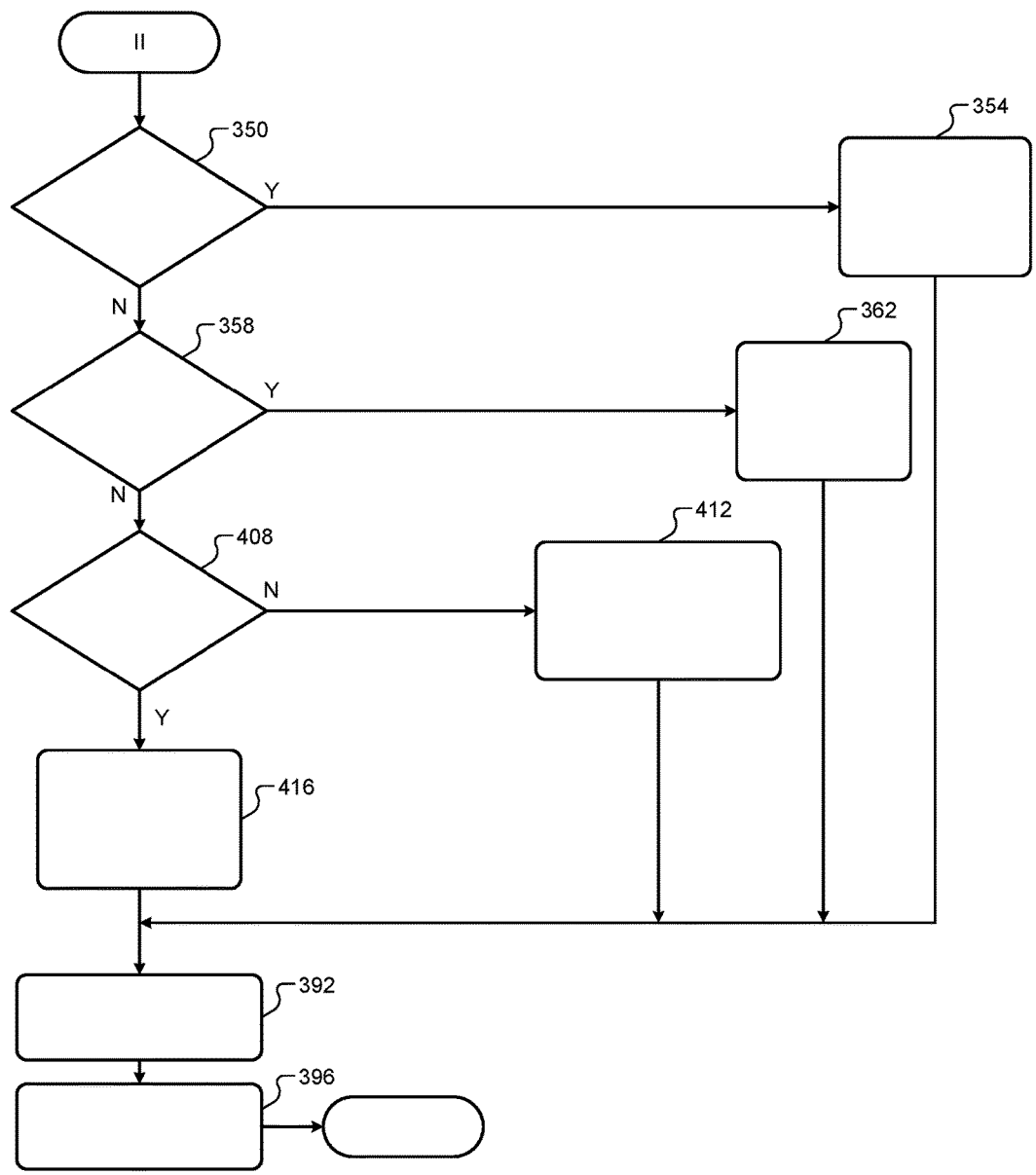

FIGS. 4A and 4B are collectively a flowchart depicting an example method of setting how many output frequencies to output predetermined engine sounds and how many output frequencies to output predetermined electric vehicle sounds based on vehicle speed. Control may proceed with 304-362, as discussed above. If 358 is false, control may continue with 408 (FIG. 4B).

At 408, the allocation module 208 may determine whether to make an adjustment relative to the predetermined default allocation 232 based on the vehicle speed 252. For example, the allocation module 208 may determine whether the vehicle speed 252 is greater than a predetermined speed at 408. If 408 is false, the allocation module 208 may set the engine/electric vehicle allocation 228 to the predetermined default allocation 232 at 412, and control may proceed with 392 and 396, as discussed above. If 408 is true, control may adjust the predetermined default allocation 232 based on the vehicle speed 252 at 416 before continuing with 392 to 396. For example, the allocation module 208 may increase the first percentage for outputting engine sounds and decrease the second percentage for outputting electric vehicle sounds as the vehicle speed 252 increases and vice versa. In this way, more frequencies may be used to output the predetermined engine sounds 238 and fewer frequencies may be used to output the predetermined EV sounds 239 as the vehicle speed 252 increases.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:
1. An audio system of a vehicle, comprising:
   a total frequencies module that selectively varies a total number of output frequencies based on a first one or more present operating parameters of the vehicle;
   an allocation module that, based on a second one or more present operating parameters of the vehicle, determines an allocation indicative of:

(i) a first portion of the total number of output frequencies allocated to outputting first predetermined sounds for internal combustion engine operation; and (ii) a second portion of the total number of output frequencies allocated to outputting second predetermined sounds for electric motor operation;

a harmonics setting module that:

(i) determines a first set of harmonic frequencies of the internal combustion engine based on (a) the total number of frequencies and (b) the first portion of the total number of frequencies; and (ii) determines a second set of harmonic frequencies of the electric motor based on (a) the total number of frequencies and (b) the second portion of the total number of frequencies; and an audio driver module that applies power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

2. The audio system of claim 1 wherein:
the first set consists of a first number of harmonic frequencies;
the second set consists of a second number of harmonic frequencies; and
a sum of the first number and the second number is equal to the total number.

3. The audio system of claim 1 wherein the first predetermined sounds are different than the second predetermined sounds.

4. The audio system of claim 1 wherein the allocation module, when the electric motor is disabled and the engine is in use, sets the first portion of the total number of output frequencies equal to the total number output frequencies and sets the second portion of the total number of output frequencies to zero.

5. The audio system of claim 1 wherein the allocation module, when the electric motor is in use and the engine is in shut down, sets the first portion of the total number of output frequencies to zero and sets the second portion of the total number of output frequencies equal to the total number output frequencies.

6. The audio system of claim 1 wherein the allocation module sets the allocation based on an accelerator pedal position.

7. The audio system of claim 6 wherein the allocation module sets the allocation using a predetermined default allocation when the accelerator pedal position is less than a predetermined accelerator pedal position.

8. The audio system of claim 1 wherein the total frequencies module sets the total number of output frequencies to a predetermined number of output frequencies when a driver selects a sleep mode of operation of the vehicle.

9. The audio system of claim 1 wherein the total frequencies module selectively sets the total number of output frequencies to a predetermined default number of output frequencies for outputting the first and second predetermined sounds.

10. The audio system of claim 9 wherein the total frequencies module selectively decreases the total number of output frequencies relative to the predetermined default number of output frequencies based on a driver selected mode of operation of the vehicle.

11. A vehicle audio system, comprising:
at least one memory comprising computer executable instructions;
at least one processor configured to read and execute the computer executable instructions, the computer executable instructions causing the at least one processor to:
selectively vary a total number of output frequencies based on a first one or more present operating parameters of the vehicle;
based on a second one or more present operating parameters of the vehicle, determine an allocation indicative of:
(i) a first portion of the total number of output frequencies allocated to outputting first predetermined sounds for internal combustion engine operation; and
(ii) a second portion of the total number of output frequencies allocated to outputting second predetermined sounds for electric motor operation;
determine a first set of harmonic frequencies of the internal combustion engine based on (a) the total number of frequencies and (b) the first portion of the total number of frequencies;
determine a second set of harmonic frequencies of the electric motor based on (a) the total number of frequencies and (b) the second portion of the total number of frequencies; and
apply power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

12. A non-transitory computer readable medium comprising computer executable instructions, the computer executable instructions configured to cause a processor to perform a method, the method comprising:
selectively varying a total number of output frequencies based on a first one or more present operating parameters of a vehicle;
based on a second one or more present operating parameters of the vehicle, determining an allocation indicative of:
(i) a first portion of the total number of output frequencies allocated to outputting first predetermined sounds for internal combustion engine operation; and
(ii) a second portion of the total number of output frequencies allocated to outputting second predetermined sounds for electric motor operation;
determining a first set of harmonic frequencies of the internal combustion engine based on (a) the total number of frequencies and (b) the first portion of the total number of frequencies;
determining a second set of harmonic frequencies of the electric motor based on (a) the total number of frequencies and (b) the second portion of the total number of frequencies; and
applying power to speakers of a passenger cabin of the vehicle to: (i) output the first predetermined sounds at the harmonic frequencies of the first set of harmonic frequencies; and (ii) output the second predetermined sounds at the harmonic frequencies of the second set of harmonic frequencies.

13. The non-transitory computer readable medium of claim 12, wherein:
the first set consists of a first number of harmonic frequencies;

the second set consists of a second number of harmonic frequencies; and a sum of the first number and the second number is equal to the total number.

14. The non-transitory computer readable medium of claim 12 wherein the first predetermined sounds are different than the second predetermined sounds.

15. The non-transitory computer readable medium of claim 12, the method further comprising, when the electric motor is disabled and the engine is in use:

setting the first portion of the total number of output frequencies equal to the total number output frequencies; and setting the second portion of the total number of output frequencies to zero.

16. The non-transitory computer readable medium of claim 12, the method further comprising, when the electric motor is in use and the engine is in shut down:

setting the first portion of the total number of output frequencies to zero; and setting the second portion of the total number of output frequencies equal to the total number output frequencies.

17. The non-transitory computer readable medium of claim 12, the method further comprising setting the allocation based on an accelerator pedal position.

18. The non-transitory computer readable medium of claim 17, the method further comprising setting the allocation using a predetermined default allocation when the accelerator pedal position is less than a predetermined accelerator pedal position.

19. The non-transitory computer readable medium of claim 12, the method further comprising setting the total number of output frequencies to a predetermined number of output frequencies when a driver selects a sleep mode of operation of the vehicle.

20. The non-transitory computer readable medium of claim 12, the method further comprising selectively setting the total number of output frequencies to a predetermined default number of output frequencies for outputting the first and second predetermined sounds.

* * * * *